(12) United States Patent
Squires

(10) Patent No.: US 6,783,572 B1
(45) Date of Patent: Aug. 31, 2004

(54) PANEL-BED METHOD AND APPARATUS FOR GAS AND GRANULAR MATERIAL CONTACTING

(76) Inventor: Arthur M. Squires, P.O. Box 10098, Blacksburg, VA (US) 24062

(*) Notice: Subject to any disclaimer, the term of this patent is extended or adjusted under 35 U.S.C. 154(b) by 88 days.

(21) Appl. No.: 10/303,738

(22) Filed: Nov. 26, 2002

Related U.S. Application Data
(60) Provisional application No. 60/332,544, filed on Nov. 26, 2001.

(51) Int. Cl.[7] .............................................. B01D 46/30
(52) U.S. Cl. ............................ 95/274; 95/275; 95/276; 95/107; 55/282; 55/474; 55/517; 96/108; 422/216
(58) Field of Search .......................... 95/274, 275, 276, 95/107; 55/282, 302, 474, 479, 517, 518; 96/108, 121, 129; 165/104.18; 34/498, 168, 506, 174; 422/213, 216, 219

(56) References Cited

U.S. PATENT DOCUMENTS

| | | | |
|---|---|---|---|
| 3,296,775 A | 1/1967 | Squires | |
| 3,770,388 A | * 11/1973 | Zenz | ........................... 95/276 |
| 3,800,508 A | 4/1974 | Zenz | |
| 3,926,587 A | 12/1975 | Squires | |
| 3,926,593 A | 12/1975 | Squires et al. | |
| 3,928,532 A | 12/1975 | Squires | |
| 3,957,953 A | 5/1976 | Squires | |
| 3,987,148 A | 10/1976 | Squires | |
| 4,006,533 A | * 2/1977 | Squires | ........................ 95/276 |
| 4,017,278 A | 4/1977 | Reese | |
| 4,308,036 A | * 12/1981 | Zahedi et al. | .................. 95/275 |
| 4,360,364 A | * 11/1982 | Kohl | ............................ 95/275 |
| 5,165,900 A | * 11/1992 | Miksitz | ....................... 55/474 |
| 5,527,514 A | 6/1996 | Watanabe et al. | |

OTHER PUBLICATIONS

Lee et al.; *The Panel Bed Filter*, Final Report to Electric Power Research Institute (EPRI); Report # AF–560; May 1977.
Rodon et al.; *Panel Bed Filtration Data for Three Dusts at 150° C*; Paper 79–56.5 presented at meeting of Air Pollution Control Ass'n; Cincinnati, OH; Jun. 1979; 16 pp.
Squires et al.; *The Panel Bed; A Fluid–Solid Contacting Device Exploiting a New Mode of Soil Failure*; Paper presented at POWTECH 81; Birmingham, England, Mar. 1981: 16 pages.
Risnes et al.; *Evaluation of a novel granular bed filtration system for high temperature applications*; Paper presented at Conference "Progress in Thermochemical Biomass Conversion", Tyrol, Austria: 2000; 12 pages.

* cited by examiner

*Primary Examiner*—Duane Smith
*Assistant Examiner*—Jason M. Greene
(74) *Attorney, Agent, or Firm*—James Creighton Wray; Meera P. Narasimhan

(57) ABSTRACT

There is provided an improved panel-bed method and apparatus for achieving an intimate contact of a gas and a loose granular solid material (e.g., for filtering dust from the gas). A bed of the material is housed in a tall, narrow panel, across which gas moves in a substantially horizontal direction. Gas-entry portions of the granular bed are supported by louvers that slope inwardly and upwardly from nearby their outer edges. The total area of the gas-entry faces presented by these gas-entry portions is greater than the projected vertical frontal area of the panel. After an interval of the contact, gas-entry faces of the granular material are renewed by causing en masse displacement of the material respecting the supporting louvers, the displacement producing a spill of a surface layer from each gas-entry face. This displacement is preferably accomplished by causing louvers to move sharply upward (e.g., as may be caused by an upward blow of a hammer). The displacement may also be accomplished by subjecting the panel to a reverse surge flow of gas (i.e., a "puff-back").

14 Claims, 5 Drawing Sheets

PANEL-BED METHOD AND APPARATUS FOR GAS AND GRANULAR MATERIAL CONTACTING

This application claims the benefit of U.S. Provisional Application No. 60/332,544, filed Nov. 26, 2001.

FIELD OF THE INVENTION

The invention relates to the intimate contacting of a gas and a loose granular solid material for purpose of chemically or physically treating one or both of the gaseous and solid substances, for example: to filter fine particulate matter ("dust")from the gas; to effect a chemical change in gas or solid; to remove a chemical constituent of the gas by absorption or adsorption; or to heat a cold gas by contact with a hot solid. The invention also relates to the countercurrent contacting of a gas and a granular solid material.

BACKGROUND OF THE INVENTION

An old idea is to treat a gas and a granular solid material by causing the gas to flow in the horizontal direction across a bed of the solid material disposed in a "panel" that has often been tall in comparison with its width in the direction of gas flow. Often, the "panel bed" has been held in place by louvered walls that resembled venetian blinds. My U.S. Pat. No. 4,006,533 (Feb. 8, 1977) cites early art and is incorporated by reference in the instant application.

Some designs called for continuous or intermittent motion of granular material downward through the panel, fresh material being supplied at the panel's top and "spent" material being withdrawn at its bottom. A representative recent proposal along this line is to be found in U.S. Pat. No. 5,527,514 (Jun. 18, 1996). U.S. Pat. No. 4,017,278 (Apr. 12, 1977) provided performance data for a gas-filtration device of this kind. The panel contained "gravel" 2 to 12 mm in size. Superficial velocity of dusty gas approaching the panel was 25 to 100 cm/s. Herein, superficial velocity=rate of gas flow divided by the projected vertical frontal area of the panel (panel height×panel width). Downward speed of the gravel mass was 30 cm/hr. Dust content of filtered gas ranged from ~25 to ~150 milligrams per normal cubic meter ($mg/Nm^3$). Dust that was captured by filtration accumulated within the gravel bed, not upon the gas-entry surfaces that it presented. In other words, the device filtered the dust by what practitioners term a "deep-bed filtration mechanism."

In other designs, granular material was stationary much of the time. These designs filtered dust from gas by accumulating a cake of the dust (a "filter cake")upon gas-entry faces of granular material retained in a panel bed. Such designs are capable of providing filtered gas containing levels of residual dust comparable to that provided by fabric filtration. Both a panel bed of this type and a fabric filter employ a "surface filtration mechanism," in which the filter cake is in fact the filtration medium; the primary function of either granular bed or fabric is to support the cake. Means are provided for intermittent renewal of gas-entry faces through removal of a moiety of the granular material from these faces together with accumulated dust. Means for outwardly tipping louvers that support gas-entry faces and for drawing plows horizontally along the faces have been proposed. U.S. Pat. No. 3,800,508 (Apr. 2, 1974) not only provided means for pivoting louvers but also employed a gas-entry velocity at gas-entry faces sufficient to support the faces at an angle steeper than the dynamic angle of repose of the granular material, momentary interruption of gas flow produced a spill of this material along with filter-cake.

My U.S. Pat. No. 3,296,775 (Jan. 10, 1967) disclosed a puff-back method for renewing gas-entry faces of a panel bed of the type wherein louvers support gas-entry portions of the bed. Puff-back entailed creation of a reverse transient surge flow to produce en masse displacement of granular material toward gas-entry faces of this material. My U.S. Pat. No. 4,006,533 (Feb. 8, 1977) specified a reverse transient surge flow of a more particular character, whose discovery made possible development of a practical panel-bed filter employing a surface filtration mechanism for cleaning a dusty gas (K. C. Lee, I. Rodon, M. S. Wu, R. Pfeffer, and A. M. Squires, The Panel Bed Filter, EPRI AF-560, Electric Power Research Institute, Palo Alto Calif., May 1977, I. Rodon, K. C. Lee, R. Pfeffer, and A. M. Squires, Panel Bed Filtration Data for Three Dusts at 150° C., paper 79–56.5 presented at meeting of Air Pollution Control Association, Cincinnati, Ohio, June 1979, A. M. Squires, K. C. Lee, and R. Pfeffer, The Panel Bed: A Fluid-Solid Contacting Device Exploiting a New Mode of Soil Failure, paper presented at POWTECH 81, Birmingham, England, March 1981). Operation of a panel-bed filter is cyclic, an interval of filtration alternating with a puff-back that removes both filter cakes and a moiety of sand lying directly beneath the cake, thereby renewing the bed's gas-entry faces. During an interval of filtration, paralleling the formation of the filter cake is an increase in pressure drop in the gas flowing across the bed. This pressure drop cannot be allowed to increase without limit, for two reasons: an unduly large pressure drop would increase cost for gas-compression beyond an economic limit and would impose a force upon the filter cake sufficient to break off chunks of the cake, driving these deep into the granular bed and harming filtering efficiency. Although the object of face-renewal is to present a new free face, it is inadvisable to employ such a strong puff-back as to yield an absolutely clean face. In operation of panel-bed filters, experience has taught that a clean face does not filter as well as a somewhat dirty face. In a subsequent filtering interval, I believe, a new filter cake forms quicker upon a dirty face than upon a strictly clean one.

Commercial-scale panel-bed-filter modules have now successfully cleaned hot gaseous products of combustion of both coal and wood waste, hot gas from cement production, and hot gas from electrometallurgical manufacture of ferrosilicon (this latter gas, containing a fine silica fume, is particularly difficult to clean). Typically, dust in the cleaned gas amounted to less than 5 $mg/Nm^3$.

In the tests, ordinary sand served as the granular filtration material. Suitably, the sand was about 0.15–0.45 mm in size. In small-scale tests at elevated temperature (e.g., 150 to 500° C.), I found this size, for dusts studied so far, to be substantially the largest sand size upon which a filter cake of good integrity can accumulate. Use of sands of smaller sizes affords filtered gas at lower residual dust remaining, at cost of either lower throughput or higher pressure drop in the filtered gas. For a given size of sand, to allow a filter cake to form, there are limits upon the velocity of gas entering a free face of the sand. For the 0.15–0.45 mm sand, in tests filtering a number of dusts at about 150–200° C., preferred gas-entry velocities have ranged from ~16 to ~28 cm/s (superficial velocities, from ~8 to ~14 cm/s). Herein, gas-entry velocity=rate of gas flow divided by the nominal total area of the free sand faces upon which a filter cake can accumulate. Since the profile of a gas-entry face, seen in vertical cross-section, is poorly defined, it is convenient to define a nominal area, thus:

Gas-entry face area=(straight-line distance between the face's outer and inner edges in the direction perpendicular to the edges)×(the mean of the horizontal lengths of these edges).

(Notice that this definition applies, regardless whether the face's edges are straight or curved in the horizontal direction. In state-of-the-art designs, edges are straight, but louvers that are circular in plan may be useful in some applications.) In general, a lower gas-entry velocity is preferable the smaller the size of dust to be filtered or the less cohesive the dust.

Parenthetically, I note that both larger granular material sizes and higher gas-entry velocities may be specified for panel-bed applications wherein a clean gas is treated by a contact with the granular material.

In a test of a commercial-scale panel-bed filter module, wood ash was filtered from gas at 200° C. emitted by a wood-waste boiler (H. Risnes and O. K. Sønju, Evaluation of a novel granular bed filtration system for high temperature applications, paper presented at conference on Progress in Thermal and Biomass Conversion, Tyrol, Austria, 2000). The module comprised two panel beds, each 600 mm in width and 3000 mm in height. For each bed, the projected vertical frontal area was about twice the nominal area of gas-entry faces. Thus, superficial gas velocity was about one-half the gas-entry velocity. Gas-entry sand faces received and filtered dusty gas supplied to a space surrounding the module. In cooperation with nonporous side panels, the two panel beds enclosed a central space in which cleaned gas moved upward toward an outlet. On average, residual dust in filtered gas was 1.7 mg/Nm$^3$. This excellent filtration performance has been confirmed in tests of an installation comprising 27 substantially identical modules receiving gaseous products of combustion at 190° C. from a 5 Mw wood-waste boiler (the tests having been marred, however, by a poor choice of apparatus for separating puff-backed sand from the filtered wood ash).

At its present stage of development, the panel-bed filter with puff-back is an economically attractive choice for many applications (especially, for example, for removing ash from wood-waste combustion or silica fume arising from FeSi production). An important parameter for judging a device for removing dust from a gas is the area of ground that it occupies. The "footprint" of a state-of-the-art panel-bed filter is approximately 0.13 square meter per 1,000 cubic meters per hour of dusty gas to be filtered. In contrast, the footprint of a high-efficiency electrostatic precipitator is about 0.37 m$^2$/(Km$^3$/hr) of gas flow. A fabric filter's footprint is of course even larger.

There is, however, room for improving the panel-bed filter. The fabricator of modules for tests on a wood-waste boiler, described above, complained at the large number of individual louver elements needing to be assembled. A higher gas-treating capacity per louver would constitute an advance in the art. In addition, cost of filter modules is a major part of the total cost of a filter installation. Higher superficial gas velocity (hence, larger gas-treating capacity per filter module and reduction in number of modules needed for a given application) would also advance the art.

SUMMARY OF THE INVENTION

A broad objective of the instant invention is to reduce the cost of a panel-bed installation by reducing numbers of both louvers and panel-bed modules required to meet a given gas-treating capacity. The instant invention can achieve a four-fold or greater increase in the capacity of a panel bed of given projected frontal area. The invention can achieve a four-fold or greater decrease in the number of individual louvers that must be manufactured and assembled.

An increase in panel-bed-filter capacity requires a concomitant increase in spaces required for supplying dusty gas and for carrying away cleaned gas. Accordingly, the footprint of a panel-bed installation does not decrease in the same proportion as the increase in module capacity. The instant invention can shrink the footprint from the aforementioned 0.13 m$^2$/(Km$^3$/hr) to approximately 0.09 m$^2$/(Km$^3$/hr).

Undertaking a series of tests of louvers of novel design, I have been surprised to discover that puff-back is more effective in clearing sand from louvers that incline inwardly upwardly from nearby their outer edges. A panel bed employing such louvers, in addition, presents larger gas-entry faces relative to its projected frontal area. The bed, accordingly, permits use of a higher superficial velocity for a given gas-entry velocity; i.e., the capacity of the bed for treating gas or granular material is higher than the capacity of a panel bed employing state-of-the-art louvers at the given gas-entry velocity.

A primary objective of puff-back is to cause en masse displacement of granular material toward a louver's outer edge. A uniform displacement creates a spill of the material that arises uniformly across its gas-entry face. In a state-of-the-art panel-bed filter, the displacement is far from uniform (although its success in filtering dusty gases shows that the displacement is sufficiently uniform to achieve cleaned gases containing less than 5 mg/Nm$^3$). I have been surprised to discover that en masse displacement produced by puff-back is more uniform for louvers that incline upwardly inwardly from nearby their outer edges than it is for louvers employed hitherto.

Louvers sloping upwardly from nearby their outer edges have another significant advantage. They lend themselves to a renewal by a sharp vertically upward motion of the louvers, such as may be effected by a sharp upward blow of a hammer upon a panel-bed assembly. The slope of louvers of the instant invention cooperates with a sharp upward movement to produce a highly uniform en masse displacement of granular material toward panel-bed gas-entry faces. In principle, in comparison with puff-back, a hammer up-blow upon a panel bed fitted with upwardly inwardly inclined louvers can effect greater uniformity of displacement of granular material respecting a large number of supporting louvers.

Such uniformity of the displacement affords more uniform spills of sand from the plurality of gas-entry faces of the panel bed than puff-back can achieve. Even taking extreme care in design and manufacture, I have been unable with puff-back to achieve exact uniformity of spill of "spent" granular material from each gas-entry face of a panel bed. For louvers of substantially identical geometry, substantially exact uniformity of spill is afforded by sharp-upward-motion face renewal. Such uniformity is especially important for the good performance of a panel bed whose purpose is to effect countercurrent contact of a gas and a granular material.

For convenience of reference, I sometimes use the term "hammer-blow renewal of gas-entry faces"; but it should be understood that means other than a hammer blow may induce a suitable, momentary, sharp vertical movement of supporting louvers.

An object of the invention is to provide an improved method and apparatus for the chemical and physical treatment of at least one of a gas and a granular solid material brought into contact.

Another object is to provide an improved method and apparatus for bringing a gas and a granular material into intimate contact.

Another object is to achieve countercurrenticity in the contacting of a gas and a granular material.

Another object is to provide an improved filter for removing fine particulate matter ("dust") from a gas.

Another object is to provide an improved technique for periodically removing granular material adjacent to gas-entry faces of a panel-bed gas-powder contactor.

Another object is to provide a filter or solid contactor for gas at an extremely elevated temperature.

My invention relates to an improved method of contacting gas and granular material with each other to effect physical or chemical treatment of at least one of them. Granular material is arranged in a panel bed having a plurality of transversely disposed, upwardly spaced, gas-entry portions separated by interposed supporting louvers having outer and inner edges. Gas-entry portions have gas-entry faces that are substantially contiguous with these outer edges. The louvers slope inwardly and upwardly from nearby their outer edges. The panel bed has gas-exit portions spaced horizontally apart from the inner edges. The bed communicates vertically with a superjacent space containing a supply of the granular material. Gas is caused to flow forwardly in a substantially continuing flow during the aforementioned treatment through the gas-entry portions of the granular material bed and outwardly from the gas-exit portions to effect treatment of gas or granular material or both. Thereafter, gas-entry faces are renewed by causing en masse displacement of granular material respecting the supporting louvers, thereby causing material to fall away from each gas-entry face. The en masse displacement is effected either by action of puff-back or by action of hammer-blow renewal. The action causes granular material to descend by action of gravity from the supply space to make good losses of granular material from the gas-entry faces.

My invention also relates to an improved apparatus for contacting gas and granular material with each other to effect physical or chemical treatment of at least one of them. There is provided a pair of upwardly extending, horizontally spaced-apart perforate retaining walls, with gravity means, automatically responding to demand, for supplying a loose granular material into the space between the walls. There is a plurality of granular-material support louvers each adjacent a perforation of a first perforate wall, each louver being arranged to extend outwardly from below its adjacent perforation and into a gas-inlet compartment in communication with perforations of the first wall. Each louver slopes inwardly and upwardly from nearby its outer edge. The louvers cooperate to support and expose to the gas-inlet compartment a plurality of free faces of the granular material and to retain the material in the aforementioned space. A gas-outlet compartment is in communication with perforations of the second perforate wall. There is an inlet for admitting gas into the inlet compartment, and an outlet for removing gas from the outlet compartment. Means are provided for periodically effecting en masse displacement of the granular material respecting the supporting louvers, causing a moiety of granular material to fall away from each free face and creating a demand for supply of the granular material from the aforementioned gravity means, to make good losses of material from the free faces. Two alternative means are contemplated for effecting the en masse displacement. A first means furnishes a reverse transient surge flow of gas across the panel bed (a puff-back). A second means causes the support louvers to move vertically in a sharp upward motion.

These and further and other objects and features of the invention are apparent in the disclosure, which includes the above and ongoing written specification, with the claims and the drawings.

BRIEF DESCRIPTION OF THE DRAWINGS

The invention will be more particularly described in conjunction with the following drawings wherein.

Figure 4:
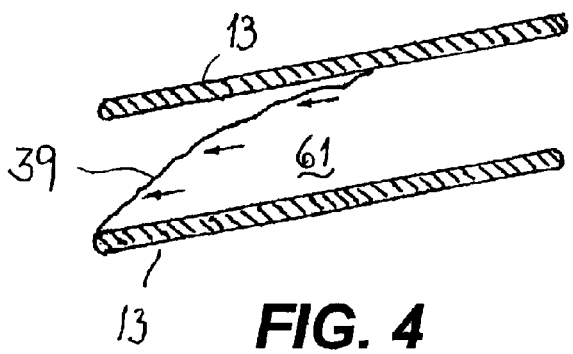
FIG. 4 illustrates the uniform en masse displacement of granular material toward gas-entry faces of the panel bed of FIG. 1 when the arrangement of FIG. 3A is employed for renewal of gas-entry faces.
Figure 5:
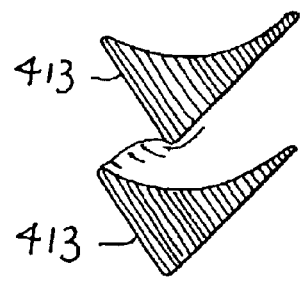

For comparison with FIG. 4, FIG. 5 generally depicts, for state-of-the-art louvers now in use in panel beds for filtration, the degree of non-uniformity seen in the displacement of granular material that accompanies puff-back renewal of gas-entry faces.

Figure 6:
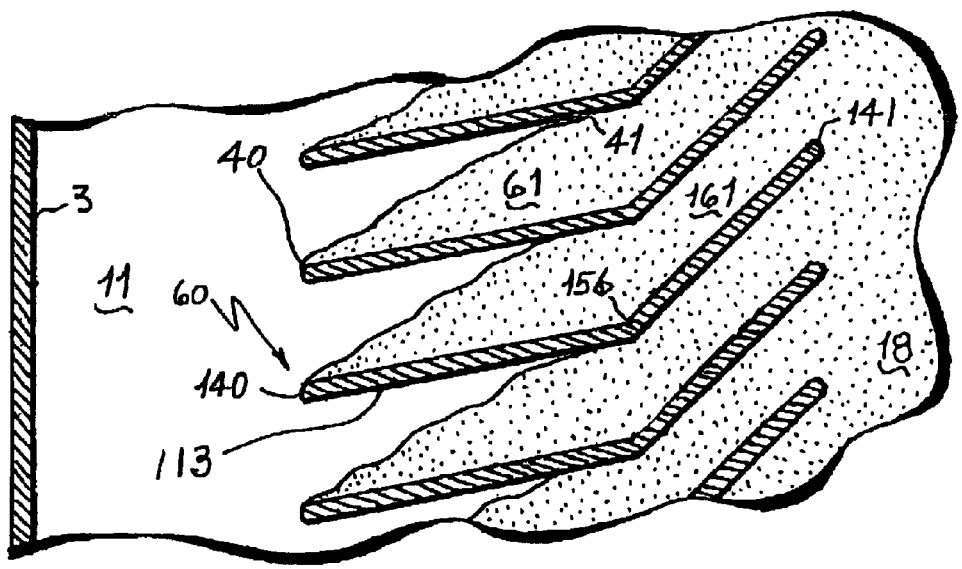

FIG. 6 generally illustrates a preferred louver design for countercurrent contacting of a gas and a granular material as well as for filtering a dusty gas.

Figure 7:
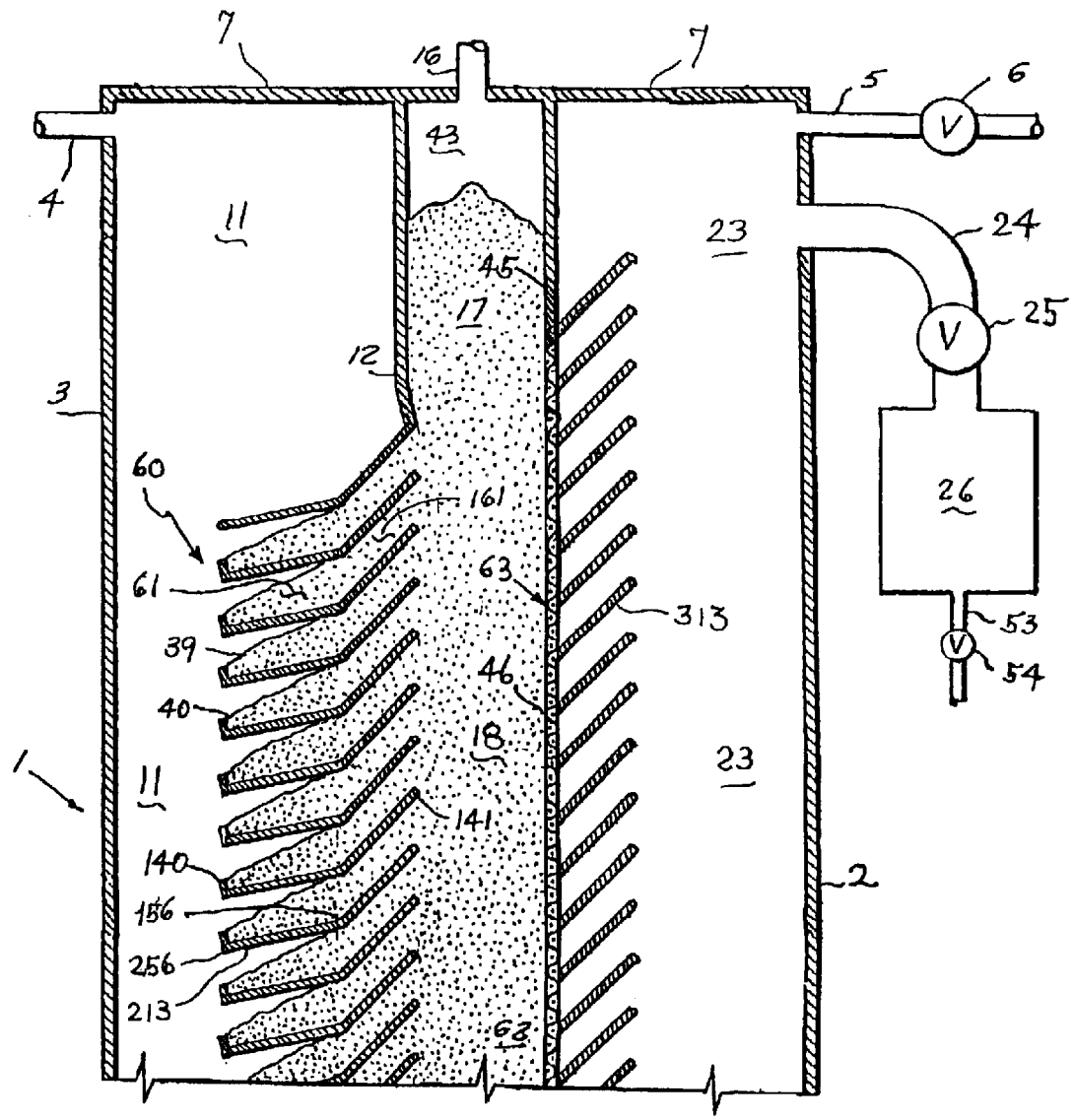

FIG. 7 is a vertical section through a panel bed of the invention fitted for puff-back renewal of gas-entry faces.

Figures 8, 9:
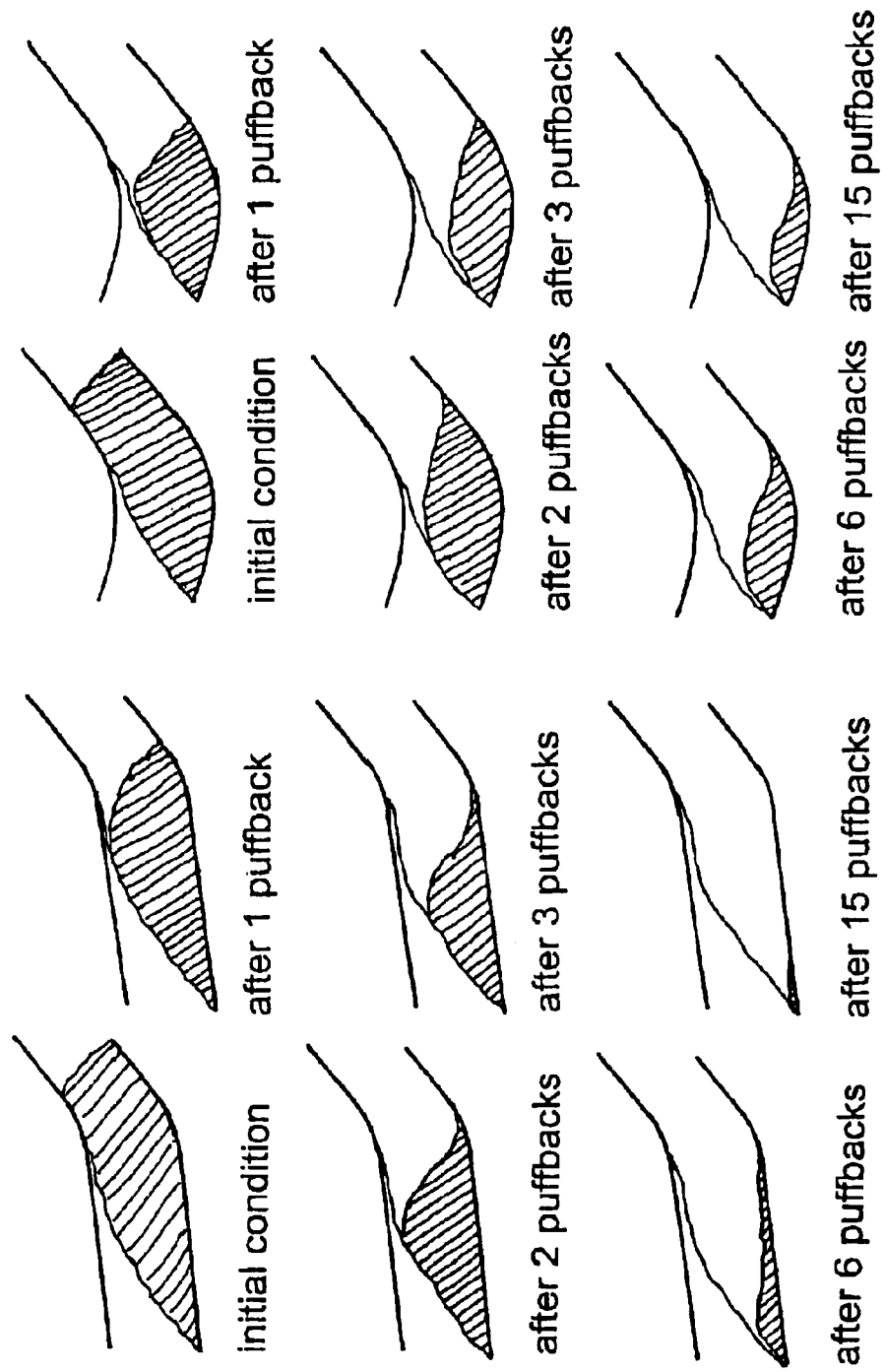

FIG. 8 is a record of tests illustrating puff-back's effectiveness in clearing "spent" granular material when puff-back is used for gas-entry face renewal in a panel bed fitted with louvers of the general type illustrated in FIG. 6.

For comparison with FIG. 8, FIG. 9 is a record of puff-back tests of a panel bed fitted with louvers that slope inwardly and downwardly from their outer edges.

DETAILED DESCRIPTION OF PREFERRED EMBODIMENTS

In the several figures, like reference numerals refer to like parts having like functions.

Figure 1:
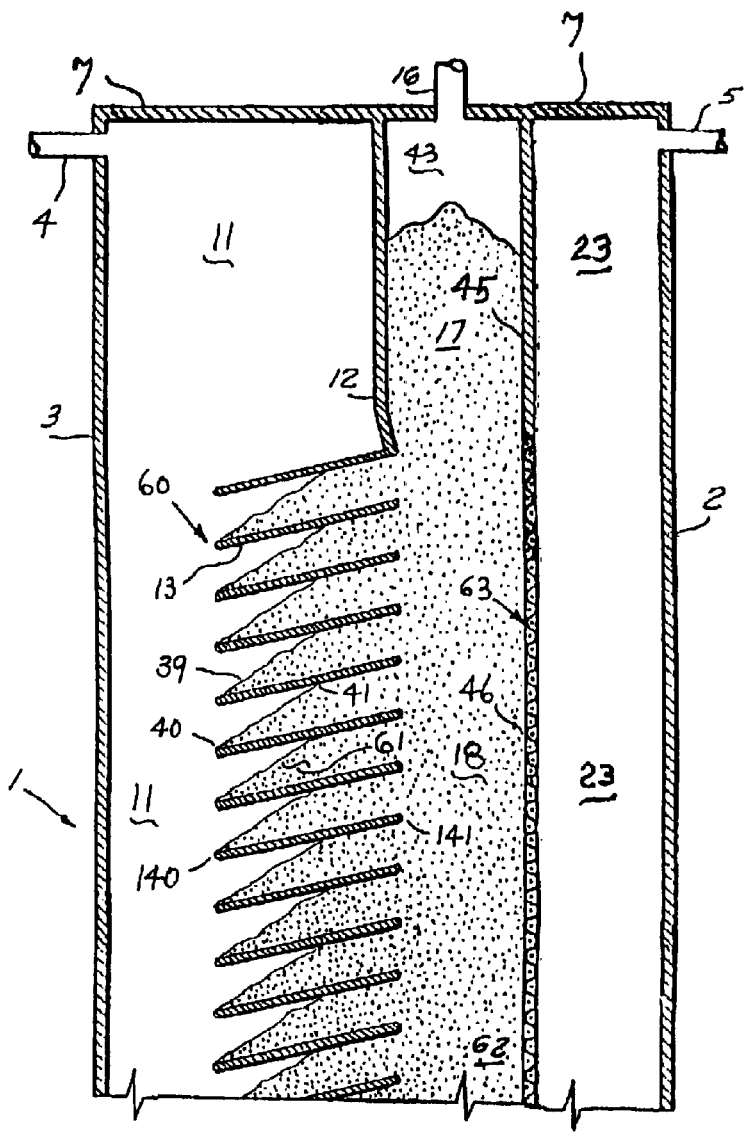
FIG. 1 is a vertical section of a panel bed of the invention, suitable for filtering a dusty gas.
Figure 1:
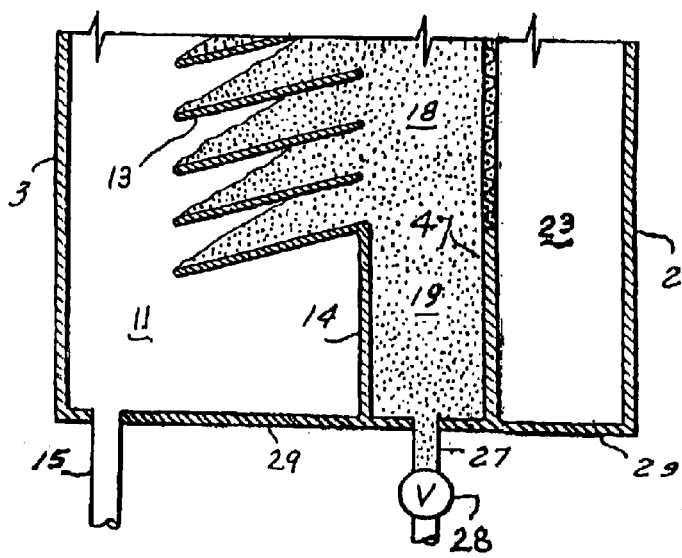
Figure 2:
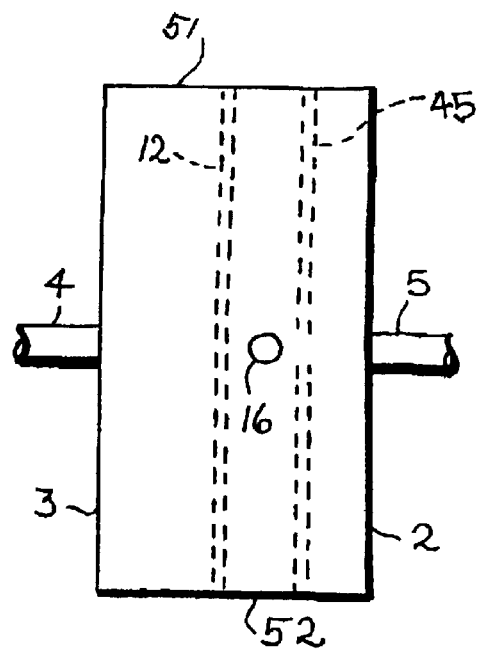
FIG. 2 is a top view of the panel bed of FIG. 1.

In FIG. 1, panel-bed gas-solid contactor 1 comprises a casing of rectangular horizontal and vertical cross-sections having opposed back wall 2 and front wall 3, top plate 7, and bottom plate 29. Opposed side walls 51 and 52 are seen in FIG. 2, a top view. Housed within the casing is granular material bed 18, comprising a loose solid granular material, retained by vertically extending, horizontally spaced apart, perforate walls 60 and 63, which extend laterally between side walls 51 and 52. Granular material is furnished to bed 18 by gravity feed from supply bed 17, retained within vertically extending, horizontally spaced apart, imperforate walls 12 and 45. Additional granular material may be added from pipe 16 to space 43 and bed 17; bed 17, if desired, may extend upward into pipe 16. Lying below bed 18 is static bed 19, retained between vertically extending, horizontally spaced apart, imperforate walls 14 and 47. Beds 17, 18, and 19 may be drained, if desired, via pipe 27 and valve 28. Top plate 7, walls 12, 60, 14, 3, 51 and 52, and bottom plate 29 enclose gas-inlet compartment 11. Gas to be treated is supplied to compartment 11 from pipe 4.

In FIG. 1, perforate wall 63 comprises wire-mesh screen 46 with openings of a size such as substantially to prevent passage of granular material from bed 18 into space 23. Top plate 7, walls 45, 63, 47, 2, 51 and 52, and bottom plate 29 enclose gas-outlet compartment 23, from which treated gas leaves via pipe 5.

Perforate wall 60 comprises a series of horizontally extending slat-like louvers 13, seen in vertical cross-section in FIG. 1. In such cross-section, each louver slopes upwardly and inwardly from an outer edge 140 toward an inner edge 141; the slope angle is suitably 13° from horizontal, as seen in FIG. 1. Each louver 13 supports a gas-entry portion 61 of bed 18. Each gas-entry portion displays a free gas-entry face 39. Outer edge 40 of a face 39 is substantially contiguous with outer edge 140 of the louver 13 supporting this face. Inner edge 41 of a face 39 is in contact with the next superjacent louver 13 along a substantially straight line parallel to this louver's two edges and lying between its outer edge 140 and inner edge 141. Horizontally spaced-apart from gas-entry portions 61 of bed 18 are gas-exit portions 62 adjacent to perforate wall 63. A perforation of wall 60 is to be considered as being formed between respective inner edges 141 of adjacent louvers 13.

Gas-entry faces 39 in FIG. 1 lie approximately at the dynamic angle of repose of the granular material. Inherently, the total area of gas-entry faces 39 is greater than the projected vertical frontal area of the gas-entry portion of panel bed 1 (i.e., the portion extending from top-most to bottom-most gas-entry face).

Figure 3:
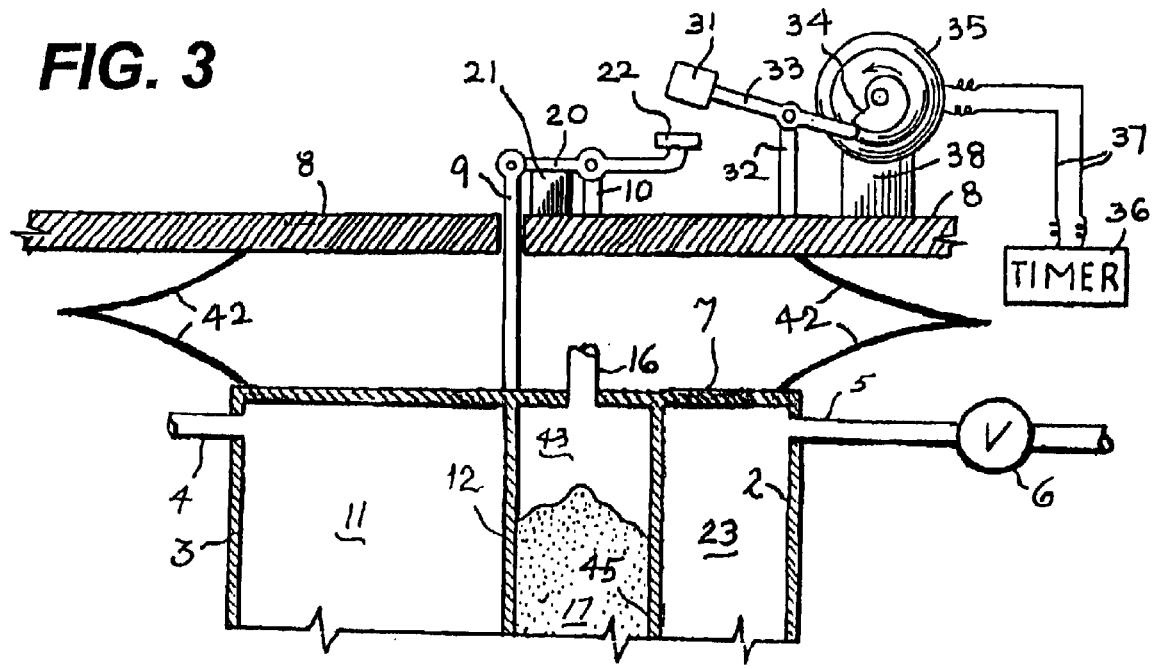
FIG. 3 illustrates an arrangement for imparting a sharp upward motion to louvers supporting free, gas-entry faces of a panel bed of the invention.

Panel bed 1 of FIG. 1 is suited for filtering a dusty gas. Its operation will now be described for this use in conjunction with a description of FIG. 3, a preferred arrangement for renewing gas-entry faces of panel bed 1. Pipe 4 is connected to a process (not shown in FIG. 1) yielding a dusty gas. Note particularly that in normal operation of the panel bed, valve 28 is closed, and granular material in bed 19 is motionless; material in beds 17 and 18 moves only momentarily, when gas-entry faces are renewed in a manner to be described.

Operation of the filter is cyclical. The cycle includes a filtration interval, occupying most of the time of the operation, and a face-renewal interval, in which free faces 39 are renewed. In the filtration interval, dusty gas is caused to flow horizontally across the panel-bed assembly, from space 11 to space 23. With selection of an appropriate rate of flow of the dusty gas and an appropriate size of granular material, a deposit of dust (i.e., a filter cake) accumulates at each gas-entry face 39. The face-renewal interval is inaugurated when filter cakes reach a desired "thickness" (i.e., a desired weight of dust per unit free face area). Knowledge that filter cakes of desired thickness have accumulated can be gained by observing drop in pressure from pipe 4 to pipe 5. During the face-renewal interval, valve 6 is advantageously closed, stopping flow of dusty gas. Face-renewal is accomplished by imparting a sharp vertically upward motion to louvers 13, causing both filter cake and a moiety of granular material to fall away from each face 39 and thereby presenting renewed faces 39 for gas entry during a subsequent filtration interval in the cycle of operation. Action of gravity causes granular material to descend from bed 17 into bed 18, to make good the loss of material from bed 18 that has accompanied renewal of faces 39.

If a number of panel beds operate in parallel, it may be preferable to activate face-renewal in one of the beds after a certain time has elapsed and, thereafter, to activate face-renewal in a each bed in turn, cyclically, at intervals of the certain time.

Vertical bar 9, attached to ceiling 7 of panel bed 1, carries the weight of the panel-bed assembly. Bar 9 is supported by an arm of horizontal lever 20, which is supported by column 10 resting upon supporting floor 8. Sharp vertically upward motion of louvers 13 is effected by causing hammer head 31 to strike pad 22 on lever 20 at the end opposite from that which supports bar 9. The strike occurs when rotary motion of eccentric cam 34 releases lever 33, allowing hammer head 31 to fall. When this occurs, the arm of lever 20 that articulates with bar 9 lifts away from column 21, which rests upon floor 8. Thereby, the hammer blow imparts a sharp vertically upward motion to louvers 13. The blow causes each pair of leaf springs 42 to move sharply together. Springs 42 should display a stiffness such that the panel bed returns to its normal vertical position promptly, thereby bringing the aforementioned arm of lever 20 again into contact with column 21. Shock-absorbing characteristics of column 21 are preferably such that the panel bed returns to its normal vertical position "cleanly" (i.e., without prolonged "chatter" after lever 20 and column 21 again come into contact). Lever 33 is supported by vertical bar 32 resting upon floor 8. Motor 35, supported by column 38 resting upon floor 8, turns cam 34 at a speed governed by timer 36, sending signals to motor 35 via electric leads 37. Further rotation of eccentric cam 34 serves to raise hammer head 31, placing it in a position for another strike upon pad 22 at the conclusion of the next filtration interval in the cycle of operation.

As arrows in FIG. 4 illustrate, the effect of a sharp upward displacement of upwardly, inwardly sloping louvers 13 is to cause a substantially uniform motion of granular material toward its free face. For best practice, the strength of the hammer blow should be such as to impart an upward acceleration to louvers 13 that is greater than the acceleration of gravity, so that each gas-entry portion 61 lifts away from the louver on which it rests. This action creates a small, temporary gap between louver and the gas-entry portion. The hammer blow, however, does not produce a motion of this portion that is precisely vertical. The portion moves perpendicularly to the slope of the louver on which the portion formerly was at rest. The motion has both a vertical and a horizontal component, the latter component shifting the gas-entry portion outward. Shortly after gap formation, action of gravity causes the portion to fall into renewed contact with its supporting louver. The fall is perpendicular downward. The combined effect of a hammer-induced lateral motion and a subsequent gravity-induced fall is to produce a uniform shift of the granular material toward the louver's outer edge. This shift causes a substantially uniform layer of a free face to drop away from the edge.

For comparison with FIG. 4, FIG. 5 generally illustrates the degree of non-uniformity seen when puff-back operates upon a panel bed with state-of-the art louvers 413 (fabricated by extruding aluminum). When displacements such as those illustrated in FIGS. 4 & 5 are observed through a glass sidewall, the eye is an excellent instrument for distinguishing between substantial uniformity and significant non-uniformity in the respective displacements.

A sharp downward motion of louvers 13 (such as could be effected by means of a downward blow of a hammer) can also serve to renew gas-entry faces 39, but only if at least one of two special circumstances obtain.

First, a sharp downward motion can be effective if the downward outward slope of louvers 13 directly beneath gas-entry portions 61 is sufficiently steep. A sharp downward motion places portions 61 momentarily in mid-air suspension, causing a spill of the material from the portions' surface layers. Portions 61 then fall directly downward, again coming at rest upon supporting louvers 13. Next (but only if these louvers are sufficiently steep nearby their outer edges 140), action of gravity may displace gas-entry portions 61 toward these edges. If louver slope is shallow near a louver edge, however, such gravity-induced displacements will not occur, and permanent regions of never-displaced material will form within gas-entry portions 61. Such material, over time, would harm filtration performance through a gradual accumulation of dust therein, tending to block flow of gas across the portions.

Second, a sharp downward motion can be effective if springs 42 return supporting louvers 13 smartly to their normal position. If their return upward is sufficiently smart, the motion can provide, in effect, a clearing of gas-entry portions 61 through a desirably sharp upward motion.

With reference again to FIG. 1, material falling into space 11 is withdrawn via pipe 15. Dust and granular material removed via pipe 15 may be taken to an operation for separating dust and granular material, so that the latter may be re-used, by charging it to bed 17 via pipe 16. In some instances (e.g., the fine silica dust from FeSi production), the dust may have economic value if maintained in a pure condition. In such instances, the granular material of bed 18 may advantageously comprise pellets of the same solid chemical species as the dust to be captured. An alternative is employment of an especially robust granular material, one that resists breakage when dropped upon a hard surface. So-called "Master Beads" of crude alumina (produced by Norton-Alcoa) are suitably robust.

FIG. 6 illustrates an alternate louver design 113. This is suitable for a panel-bed application for the countercurrent contacting of a gas either with a chemically active granular material or with a hot or cold material for purpose of heating or cooling the gas. Louvers of the louver-113 type are also advantageous for use in a tall panel bed for gas filtration, obviating a danger, after puff-back face renewal, that sand containing a moiety of filtered dust will fall away from topmost louvers of the panel when sand in bed 18 is settling downward to make good losses of sand from louvers at lower elevations (see Lee et al., *op. cit.*, May 1977).

Louver 113 comprises, first, an inwardly, upwardly sloping segment between outer edge 140 and bend 156, and second, a more steeply sloping segment between bend 156 and inner edge 141. The slope of the second segment is preferably at least 45° to horizontal. The slopes of two segments are suitably 13° and 45° to horizontal, respectively, as seen in FIG. 6. The 45° segments of two adjacent louvers 113 delimit space 161, suited for countercurrent contacting.

FIG. 7 illustrates a panel bed fitted for puff-back gas-entry face renewal. Louvers 213 are generally similar to louvers 113 in FIG. 6, with addition of bend 256 providing a shallow "dam" retaining sand near the outer edge 40 of gas-entry region 61. Pipe 24 connects space 23 with chamber 26. Gas at high pressure is supplied to chamber 26 via line 53. After chamber 26 is at the high pressure, valve 54 is closed. When face-renewal is required, valve 6 is closed, and valve 25 is quickly opened, allowing gas to rush through pipe 24 into space 23 and creating a transient surge reverse flow of gas from space 23 into space 11. Optional louvers 313 are shown, articulating with wall 63 and inclined at an angle of 45°. Experience (see Lee et al., *op. cit.*, May 1977) has shown that in some instances the presence of such louvers allows use of a wider range of puff-back intensities, without undue loss of uniformity of the en masse displacement that puff-back creates. This wider range increases the range of sand-spill quantities that may be achieved.

Using apparatus with a glass sidewall, I observed effects of successive puff-backs upon sand supported by louvers of the general type illustrated in FIG. 6. Facilitating the tests, I discovered that a certain olivine sand turns from gray to a reddish brown in color if heated to 700° C. (with no significant change in particle size or other properties). For the puff-back tests, I placed brown sand within the space between two adjacent louvers, as seen in the sketch at the upper left in FIG. 8. Here, shading indicates presence of brown sand. The remaining sketches in FIG. 8 illustrate the disposition of brown and gray sand after the designated numbers of puff-backs have acted. As the sketches illustrate, the displacement produced by a puff-back was not perfectly uniform (as simple observation by eye had already disclosed); yet, nevertheless, after 15 puff-backs had acted, a negligible quantity of the brown sand remained.

Effects of puff-back in FIG. 8 can best be judged by comparing sketches in FIG. 8 and FIG. 9. The latter illustrates effects of a series of puff-backs upon sand resting upon a louver that presented an inwardly descending surface nearby its outer edge (as seen in FIG. 9). Dispositions of brown sand in FIG. 9 illustrate not only a greater departure from uniformity of the displacement but also presence of a greater quantity of the brown sand remaining after action of 15 puff-backs. Although I do not fully understand what may explain the better performance of puff-back in FIG. 8 in the comparison with FIG. 9, I note that gravity assists the displacement of sand toward the outer edge of the louver in FIG. 8, whereas gravity opposes this movement in FIG. 9. I have not conducted tests using the FIG. 9 louver, with puff-back gas-entry face renewal, to filter a dusty gas; but I believe such tests would show it to perform less well than the state-of-the-art louvers. Tests of louvers of the type exemplified by FIG. 8, on the other hand, provided filtration performance comparable to that of the state-of-the-art louvers.

The greater uniformity of displacement is one advantage of a louver that presents an inwardly ascending surface nearby its outer edge. It has an important second advantage. A gas-entry portion of a panel bed retained between a pair of louvers of this type presents a larger gas-entry face area than a portion retained between louver-pairs of the type illustrated by FIG. 9, having an inwardly descending surface nearby its outer edge. A panel-bed design using louvers of the type exemplified by FIG. 8 can readily present a total gas-entry face area comparable to or greater than the projected vertical frontal area of the panel bed.

FIGS. 1 and 7 show a perforate wall 63 comprising a wire screen. For some applications, this may not be the best choice from point of view either of cost or of ruggedness in use. Those skilled in the art will recognize other arrangements suitable for use in wall 63. For example, in a panel bed intended for operation at a temperature beyond 1,000° C., a porous sintered ceramic plate is advantageous for use in wall 63; indeed, for this application substantially the entire panel bed can be fabricated in form of ceramic elements.

I do not wish my invention to be limited to the particular embodiments illustrated in the drawings and described above in detail. Those skilled in the art will recognize other arrangements as well as combinations of the instant invention with other adaptations or applications of a panel bed fitted for face-renewal through displacement of granular material toward gas-entry faces, such as a panel-bed filter with electrostatic boost (U.S. Pat. No. 3,926,587, Dec. 16, 1975); treating gas and wetted granular material (U.S. Pat. No. 3,987,148, Oct. 19, 1976); heat exchange (U.S. Pat. No. 3,981,355, Sep. 21, 1976); treating gas with catalytic dust (U.S. Pat. No. 3,957,953, May 18, 1976); filtering micron-size aerosol using pre-coated panel bed (U.S. Pat. No. 3,926,593, Dec. 16, 1976); treating gas with chemically active dust coating gas-entry faces of panel bed (U.S. Pat. No. 3,928,532, Dec. 23, 1975).

While the invention has been described with reference to specific embodiments, modifications and variations of the invention may be constructed without departing from the scope of the invention, which is defined in the following claims.

I claim:

1. A method of contacting gas and granular material with each other to effect physical or chemical treatment of at least one of them, comprising:
   a) arranging granular material in a panel bed having a plurality of transversely disposed upwardly spaced gas-entry portions separated by interposed supporting louvers having outer and inner edges with respect to said bed, said louvers sloping upwardly from nearby said outer edges, said gas-entry portions having gas-entry faces with outer edges substantially contiguous with said outer edges of said supporting louvers, said bed having gas-exit portions spaced from said inner edges, and said bed communicating with a space containing said granular material and capable through action of gravity of supplying said material to said panel bed on demand;
   b) forwardly flowing gas in a substantially continuing flow during said treatment through said gas-entry portions of said panel bed and outwardly from said gas-exit portions to effect said treatment; and
   c) thereafter creating en masse displacement of said gas-entry portions respecting said supporting louvers, thereby producing a spill of said granular material from said gas-entry faces and renewing said faces, and thereby creating demand for supply of said granular material to said panel bed.

2. The method of claim 1 in which the total area of said gas-entry faces is greater than the projected vertical frontal area of the panel bed.

3. The method of claim 1 in which said en masse displacement is caused by a sharp vertical motion of said supporting louvers.

4. The method of claim 3 in which said motion is upward.

5. The method of claim 1 in which said en masse displacement is caused by a reverse transient surge flow of gas, moving inwardly into said gas-exit portions and outwardly from said gas-inlet portions.

6. The method of claim 1 in which said treatment includes filtration of fine particulate matter from a dusty gas.

7. The method of claim 6 in which particle size of said granular material and velocity of said forwardly flowing gas are such that a filter cake of dust forms upon each said gas-entry face.

8. The method of claim 1 in which said treatment includes a countercurrent contacting of said gas and said granular material, each said supporting louver comprising
   an outer segment sloping inwardly from nearby said louver's outer edge at a first angle to the horizontal, and
   an inner segment articulating with said outer segment and sloping upwardly toward said louver's inner edge at a second, steeper angle to the horizontal.

9. The method of claim 8 in which said second angle is at least 45 degrees.

10. A method of contacting gas and granular material with each other to effect physical or chemical treatment of at least one of them, comprising:
    a) arranging granular material in a panel bed having a plurality of transversely disposed upwardly spaced gas-entry portions separated by interposed supporting louvers having outer and inner edges with respect to said bed, said louvers sloping upwardly from nearby said outer edges, said gas-entry portions having gas-entry faces with outer edges substantially contiguous with said outer edges of said supporting louvers, said bed having gas-exit portions spaced from said inner edges, and said bed communicating with a space containing said granular material and capable through action of gravity of supplying said material to said panel bed on demand;
    b) forwardly flowing gas in a substantially continuing flow during said treatment through said gas-entry portions of said panel bed and outwardly from said gas-exit portions to effect said treatment; and
    c) thereafter creating en masse displacement of said gas-entry portions respecting said supporting louvers through action of a sharp upward motion of said louvers, thereby producing a spill of said granular material from said gas-entry faces and renewing said faces, and thereby creating demand for supply of said granular material to said panel bed.

11. A method of contacting gas and granular material with each other to effect physical or chemical treatment of at least one of them, comprising:
    a) arranging granular material in a panel bed having a plurality of transversely disposed upwardly spaced gas-entry portions separated by interposed supporting louvers having outer and inner edges with respect to said bed, said louvers sloping upwardly from nearby said outer edges, said gas-entry portions having gas-entry faces with outer edges substantially contiguous with said outer edges of said supporting louvers, said bed having gas-exit portions spaced from said inner edges, and said bed communicating with a space containing said granular material and capable through action of gravity of supplying said material to said panel bed on demand;
    b) forwardly flowing gas in a substantially continuing flow during said treatment through said gas-entry portions of said panel bed and outwardly from said gas-exit portions to effect said treatment; and
    c) thereafter creating en masse displacement of said gas-entry portions respecting said supporting louvers through action of a reverse transient surge flow of gas, moving inwardly into said gas-exit portions and outwardly from said gas-entry portions, thereby producing a spill of said granular material from said gas-entry faces and renewing said faces, and thereby creating demand for supply of said granular material to said panel bed.

12. A gas filter comprising
    two upwardly extending horizontally spaced-apart perforate retaining walls,
    a gas-inlet compartment adjacent and in flow communication with the perforations of the first of the perforate walls, a gas-outlet compartment in flow communication with the perforations of the second of the perforate walls, an inlet for admitting gas into said gas-inlet compartment, an outlet for removing gas from said gas-outlet compartment, closure means about the space between said perforate walls closing said space against passage of gas from said inlet compartment to said outlet compartment except through perforations of said perforate walls, gravity feed means for supplying a loose solid granular material into said space, a plurality of supporting louvers each adjacent a perforation of said first perforate wall, said supporting louvers being arranged to extend outwardly from below their adjacent perforations and into said gas-inlet compartment to support and expose to said compartment a plurality of free faces of said granular material, said supporting louvers being arranged cooperatively to support the granular material and retain the material within said space, each said supporting louver sloping upwardly from nearby said louver's outer edge, and means for creating en masse displacement of said granular material respecting said supporting louvers, thereby causing a moiety of said granular material to fall away from each said free face and activating said gravity feed means to cause the renewal of said free faces.

13. The gas filter of claim 12 in which said means for creating said en masse displacement comprises means for causing said supporting louvers to move sharply upward.

14. The gas filter of claim 12 in which said means for creating said en masse displacement comprises means for producing a reverse transient surge flow of gas, moving from said outlet compartment into said inlet compartment.

* * * * *